United States Patent Office 3,570,208
Patented Mar. 16, 1971

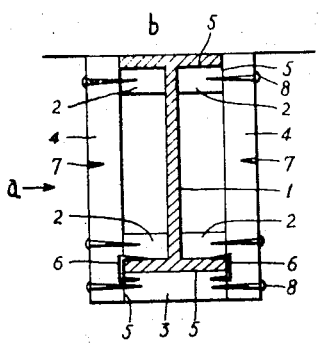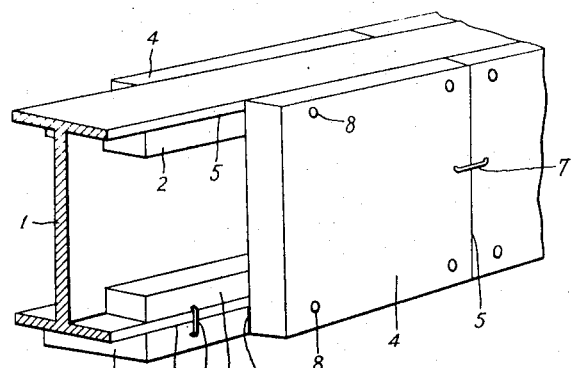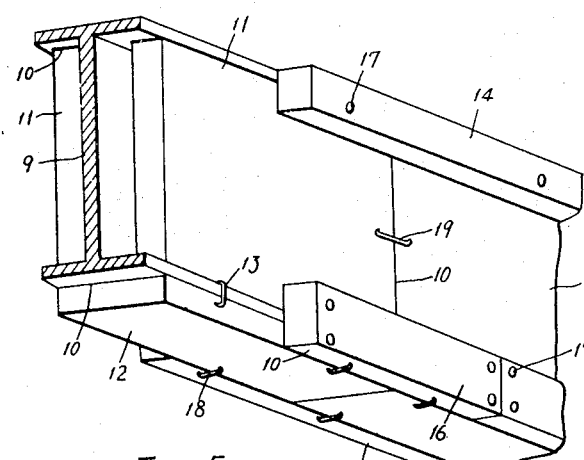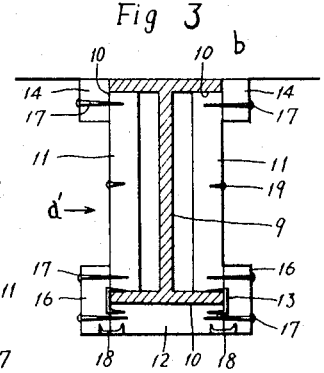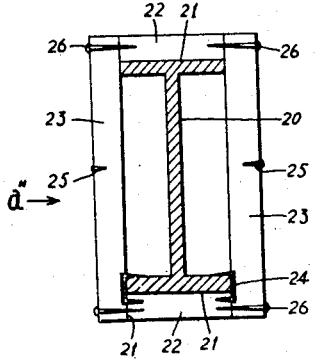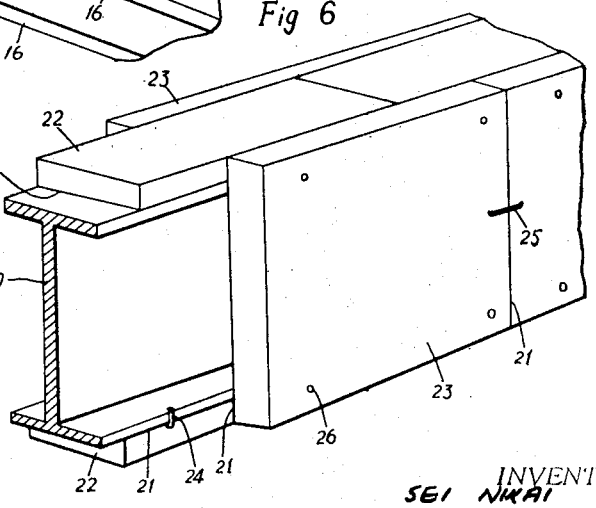
INVENTORS
SEI NIKAI
KIICHI ISHII
SHINSAKU MIYAKE
BY McGlew and Toren
ATTORNEYS

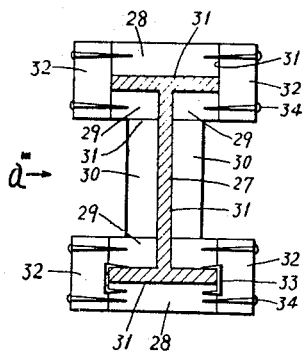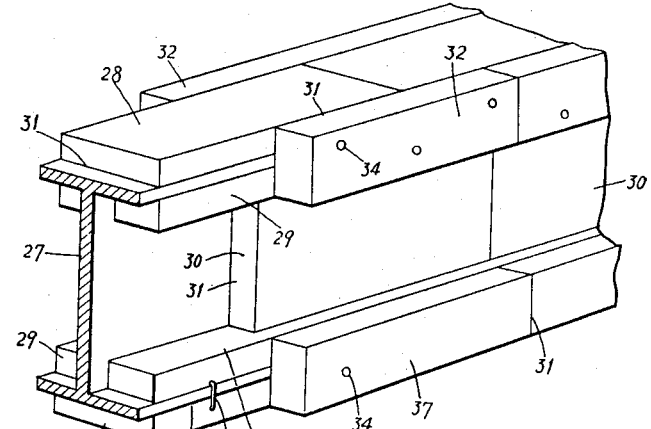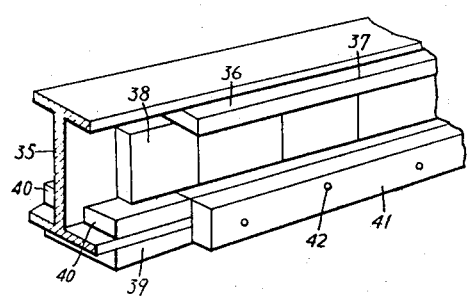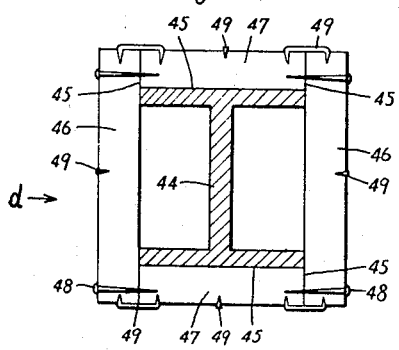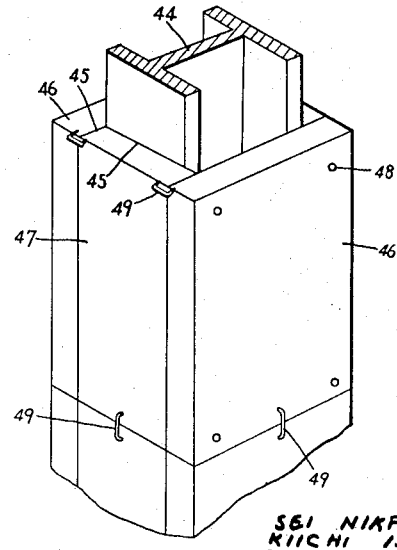

3,570,208
METHOD OF FORMING FIREPROOF LAYERS
OUTSIDE STEEL SKELETONS AND BEAMS
Sei Nikai and Kiichi Ishii, Tokyo, and Shinsaku Miyake, Soka, Japan, assignors to Nippon Valqua Industries Limited and Kajima Corporation, both of Tokyo, Japan
Continuation-in-part of application Ser. No. 624,844, Mar. 21, 1967. This application Aug. 4, 1969, Ser. No. 847,345
Claims priority, application Japan, Mar. 23, 1966, 41/18,747; Sept. 6, 1966, 41/83,528
Int. Cl. E04b 1/94
U.S. Cl. 52—746                                                5 Claims

ABSTRACT OF THE DISCLOSURE

Structures or structural shape frame members, such as beams, columns, and pillars having spaced flanges joined by connecting webs for construction use, are enclosed by molded plates made of a fire-proof material, such as asbestos, cement, vermiculite, perlite, gypsum, rock wool or the like, formed into the required shape. The molded plates are secured to the structural members by applying a fire-proof adhesive agent to the joint portions of the structural members and molded plates and also between the molded plates themselves so that the joint portions can be combined together in a body while using clamps or nails for temporary support thereby forming fire-proof layers about the structural members. For example, a fire-proof material such as asbestos or the like is rendered sufficiently fiber-open and a suitable amount of cement, as a binding agent, is incorporated in the asbestos fibers thus opened and the mixture is fed into a mold under pressure for consolidation into the required size and shape of the molded plates used (blocks and plates) as fire-proof covering members. An adhesive agent made of a mixture of sodium silicate 65% by weight, and asbestos fibers chamotte and fire-proof cement 35% by weight is applied to the joint portions of the structural members and molded members and also between adjacent molded members so that the joint portions can be combined and fixed together while using clamps and nails to form temporary support as the adhesive sets to form fire-proof layers of the required thickness.

Thus it is possible to cover the outside of a structural member including its corners to an exact size by merely securing the fire-proof molded members to the outside of the structural member by means of the adhesive agent, thereby obtaining durable and strong beams and pillars completely covered by said molded fire-proof covering members.

BACKGROUND OF THE INVENTION

This is a continuation-in-part application of Ser. No. 624,844 filed on Mar. 21, 1967, and now abandoned.

SUMMARY OF THE INVENTION

This invention relates to a method of forming fire-proof covering layers for the exterior of structural steel shapes or frames and also relates to fire-proof enclosures for construction structures, or structural shape frame members, such as columns, beams and pillars having spaced flanges connected by webs and comprising molded members made of a fire-proof material and formed into the required shape for placement on the exterior of flanges and webs of the structural steel frame. By applying fire-proof adhesive agent to the joint portions of the steel frame and molded members and also between the molded members a completely enclosing unified fire-proof enclosure can be formed. During the joining of the molded members with the adhesive agent, clamps and nails are used for temporary support.

According to the conventional methods of the prior art, the formation of a fire-proof layer of asbestos on a steel skeleton for construction use has been carried out by blasting or pressure spraying a mixture of asbestos and a binding agent directly onto the external surface of the steel skeleton to form an asbestos layer of the required thickness from the asbestos mixture only, this layer being further processed onto a beam or pillar respectively. However, in this case, the asbestos mixture for adhesive purposes has great difficulty in pervading the four corners of a pillar or similar structural shape and in covering both end portions of the flange of the steel skeleton so that it is not only very difficult to form an adequate asbestos layer of an accurate size on such portions, but also the availability of uniform bulk density is difficult to obtain at the working site, thus requiring many procedures and considerable time to achieve satisfactory covering effects and presenting an unavoidable drawback of poor efficiency in operation.

In contrast, the method of the present invention has proved effective in eliminating the above-mentioned drawback inherent in the blasting method of the prior art. According to the present invention, mixtures of fire-proof materials such as asbestos and cement, vermiculite, perlite, gypsum, rock wool, etc. are formed into molded members of the required size which are placed in adjacent arrangement about the exterior of steel frames, the adjacent molded members are joined together in a body by means of an adhesive agent to form fire-proof covering layers outside the steel skeleton whereby it is possible to achieve a covering effect on the steel skeleton for the formation of a pillar or beam and on every corner thereof by the fixation of the molded members at a time and to an exact size, and, furthermore, the material of the fire-proof covering layer and bulk density can be made uniform throughout the flat surface of the beam or pillar and their corners to ensure the formation of the layer in an exact and uniform manner. Further the molded members are combined mechanically and accurately by means of clamps and nails until the adhesive agent sets and becomes sufficiently solid to prevent stripping-off or falling-off of the molded members, thereby ensuring a quick jointing of the molded members to the steel skeleton and to one another, and thereby forming a fire-proof covering layer of the required thickness entirely uniform throughout, and providing structures, beams and pillars of the type manufactured by the present method.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a vertical sectional view of a first embodiment of a steel skeleton according to the present invention;

FIG. 2 is a perspective view of the embodiment illustrated in FIG. 1;

FIG. 3 is a vertical sectional view of a second embodiment of a steel skeleton;

FIG. 4 is a perspective view of the embodiment illustrated in FIG. 3;

FIG. 5 is a vertical sectional view of a third embodiment of a steel skeleton;

FIG. 6 is a perspective view of the embodiment illustrated in FIG. 5;

FIG. 7 is a vertical sectional view of a fourth embodiment of a steel skeleton;

FIG. 8 is a perspective view of the embodiment illustrated in FIG. 7;

FIG. 9 is a vertical sectional view of an under-floor steel skeleton;

FIG. 10 is a perspective view of the arrangement shown in FIG. 10;

FIG. 11 is a horizontal sectional view of a steel pillar; and

FIG. 12 is a perspective view of the steel pillar shown in FIG. 11.

GENERAL DESCRIPTION OF THE PREFERRED EMBODIMENTS

Referring to the accompanying drawings in particular, all embodiments will be explained in detail as follows:

FIGS. 1 and 2 show a first embodiment of a steel shape skeleton, i.e., an I-beam structural shape. In the drawings, reference $a$ shows a steel beam in contact with the lower surface of a concrete floor $b$ of a construction structure. An I-beam type steel frame member is indicated at 1 having a pair of spaced flange connected by a web for use as the beam $a$, 2, 3 and 4 are fire-proof covering members formed into the required shape, and composed of sufficiently opened fibers of asbestos and a suitable amount of cement as a binding agent being compressed and hardened in a required mold to a volumetric specific gravity of 0.4–0.45. An adhesive agent 5 is applied to the joint portions of the steel shape or skeleton and molded members 2, 3 and 4 and of adjacent molded members and themselves, the adhesive agent being composed of sodium silicate 65% by weight, asbestos fibers chamotte and fire-proof cement 35% by weight and being capable of withstanding up to 1100° C. Reference 6 indicate clamps for supporting the lower molded plate 3 beneath the lower flange of the steel skeleton 1, reference 7 clamps for supporting adjacent molded plates 4, 4 at both sides of the steel skeleton, the clamps being made of slender wire and 8 nails struck through the molded plates 2, 3 and 4 for supporting them together. According to the construction of this steel beam, the adhesive agent is applied to both internal surfaces of the upper and lower flanges of steel skeleton 1 fixed beneath the floor $b$ so that each molded plate 2 can be fixed below each internal surface of upper and lower flanges of steel skeleton and the molded plate 3 of the same size adjacent the external surface of the lower flange of steel skeleton respectively on one hand and on the other hand, the upper piece of clamp 6 is adapted to contact the internal surface of the lower flange of steel skeleton and the lower piece thereof is struck into said molded plate 3 to bind them up in a body.

Subsequently, the adhesive agent 5 is applied to the external surface of the molded plates 2 and both surfaces of the molded plate 3 to which are attached the upper and lower internal surfaces of both molded plates 4 so that the molded plates 3 and 4 can cover the steel skeleton 1 by adhesion, several nails 8 are inserted at suitable intervals on the joint portions of the molded plate 4 with the other molded plates 2 and 3 for their combination in a body and all the plates 2, 3 and 4 are assembled in a body mechanically by means of said clamps 6 and 7 for being fixed to the steel skeleton 1. Thus the same operation is repeated in order along the steel skeleton in the same direction, the adhesive agent 5 applied to the joint portions of adjacent molded plates 2, 3 and 4, the clamps 7 struck onto the molded plates 4, 4 thereby constituting a fire-proof covering layer of the required thickness consisting of several molded plates 2, 3 and 4 thus combined in a body outside the steel skeleton 1 to form the beam $a$. In this way, the steel skeleton is covered completely by the fire-proof molded plates 2, 3 and 4 and fixed perfectly by means of the adhesive agent between the steel skeleton and molded plates 3 and 4 and adjacent molded plates 2, 3 and 4 themselves. Since the adhesive agent 5 secures the molded plates to the steel skeleton, the clamps and nails need only afford a temporary support while the adhesive agent takes its set, and the beam $a$ can be obtained having quite a non-stripping-off and non-falling-off, durable and strong fire-proof covering layer. However, the clamps and nails are normally retained in the fire-proof enclosure about the beam. It will be noted that none of the mechanical means, used for supporting the molded plates about the beam while the adhesive agent sets, extend from the exterior of the fire-proof enclosure into contact with the enclosed beam. As a result, no thermal bridge exists through the enclosure from its exterior surface of the enclosed beam.

Referring to FIGS. 3 and 4, wherein a second embodiment of a beam enclosure is shown, an adhesive agent 10 is applied to the top-end internal surface of both flanges of a steel skeleton 9, molded plates 11 are inserted between both flanges on one hand and on the other hand, likewise in the first embodiment of beam, a molded plate 12 is fixed to the lower surface of the steel skeleton 9 by means of clamps 13, the adhesive agent 10 is also applied to the upper and lower end of external surface of the molded plate 11 and both side surfaces of the molded plate 12 so that a molded plate 14 is so provided as its upper surface contacts the floor $b$ at the upper side and another molded plate 16 as wide as double the thickness of the molded plate 12 plus the thickness of flange of the steel skeleton 9 is also provided at the lower side respectively and all these molded plates 11, 12, 14, and 16 are so combined by adhesion as to cover the steel skeleton 9, then a number of nails 17 are struck onto the joint portions of the molded plates 14 and 11 and others 16, 11 and 12 respectively and the clamps 18 are struck onto the joint portions of the molded plates 12 and 16 so that the plates 11, 12, 14 and 16 are fixed to the steel skeleton 9 by means of clamps 13, 18 and nails 17 temporarily until the adhesive agent has set.

Thus, the above-mentioned operation is repeated in good order along the steel skeleton 9 in the same direction, namely, the adhesive agent 10 is also applied to the joint portions of the molded plates 11, 12, 14 and 16 adjacent each other in the same direction as above, clamps 19 are struck onto the joint portions of the molded plates 11, 11 and thus the plates 11, 12, 14 and 16 are combined in a body for arrangement outside the steel skeleton 1 to form a fire-proof covering layer of the required thickness thereby constituting the beam $a'$ as desired.

According to this construction, the steel I-beam or skeleton 9 is covered by the fire-proof molded plates 11, 12, 14 and 16, all of which are perfectly fixed by means of the adhesive agent applied to the joint portions of the steel skeleton and molded plates 11, 12, 14 and 16 and also between adjacent molded plates 11, 12, 14 and 16 themselves and also by means of clamps and nails struck onto them so that the required beam $a'$ can be obtained having a non-stripping-off, non-falling-off, durable and strong covering layer after the adhesive agent has attained its final set.

FIGS. 5 and 6 show a third embodiment of an I-beam for illustrative purposes. This beam is constructed such that an adhesive agent 21 is applied to the external surface of the upper flange of a steel skeleton 20, on which is placed a molded plate 22 of the same width as that of said upper flange, the adhesive agent being also applied to both sides of said molded plate so that, as in the case of FIGS. 1 and 2, both top molded plate 22 and side plates 23 are combined together to enclose the steel skeleton 20 thereby, and all the plates are fixed surrounding the steel skeleton by means of clamps 24, 25 and nails 26 affording a support for the fire-proof enclosure as the adhesive agent sets. This combining operation being repeated in order along the steel skeleton in the same direction, the adhesive agent 21 being further applied to the joint portions of adjacent molded plates 22 and 23, clamps 25 being struck onto the joint portions of the molded plates 23 themselves to obtain the required beam $a''$ with the formation of a fire-proof covering layer of the required thickness consisting of several molded plates 22 and 23 combined in a body surrounding the steel skeleton 20. According to this construction, the steel skeleton is covered by the fireproof molded plates 22 and 23 satisfactorily and they are fixed perfectly by means of the adhesive agent 21 applied to the joint portions of the steel skeleton and molded plates 22 and 23 and also between adjacent molded plates themselves and after the clamps 24 and 25 and nails 26 struck onto them the beam $a''$ has a non-stripping-off, non-falling-off, durable and strong covering layer.

FIGS. 7 and 8 show a fourth embodiment of a beam, according to the present invention. On the external surface of both flanges of an I-beam structural shape steel skeleton 27 is placed a molded plate 28 of the same width as that of flange of steel skeleton, another molded plate 29 is placed inside both pieces of each flange, another molded plate 30 is placed intermediate between both flanges along the steel skeleton respectively with the application of an adhesive agent 31 between them, the adhesive agent being also applied to the joint portions of the molded plates 29 and 30, clamps 33 being struck, from both sides, onto the molded plate 28 placed at the external surface of the lower flange of steel skeleton at suitable intervals in such a manner that the upper piece of clamp is adapted to contact the upper surface of flange and the lower piece thereof is struck onto the molded plate 28 for fixing said molded plates to the lower flange of the steel skeleton 27. Subsequently, the adhesive agent 31 is applied to the lateral and external surfaces of steel skeleton 27 and to the molded plates 28 and 29 at both upper and lower flanges of steel skeleton, other molded plates 32 of the same width as that of the above-mentioned assembly are arranged to enclose the steel skeleton in said molded plates 28, 29 and 32, a few nails 34 being inserted, from outside, onto the joint portions of the molded plates 32, 28 and 29 combined in a body for fixation to the steel skeleton. None of the nails inserted from the exterior of the molded plate contacts the enclosed beam. Then this operation is repeated in good order along the steel skeleton 27 in the same direction and the adhesive agent also applied to the joint portions of adjacent molded plates 28, 29, 30 and 32 themselves thereby constructing a beam $a'''$ with the formation of a fire-proof covering layer of the required thickness consisting of the molded plates 28, 29, 30 and 32 combined in a body for arrangement outside the steel skeleton 27. According to this construction, the steel skeleton 27 is covered perfectly by the fire-proof molded plates 28, 29, 30 and 32 and all this assembly is fixed to the steel skeleton by means of the adhesive agent 31 applied to the joint portions of the steel skeleton 27 and molded plates 28, 29, 30 and 32 and also between the molded plates 28, 29, 30 and 32 themselves, and by clamps 33 and nails 34, thereby obtaining said beam $a'''$ composed of a non-stripping-off, non-falling-off, durable, and strong fire-proof covering layer.

FIGS. 9 and 10 show an embodiment of an under-floor beam, according to the present invention. A molded plate 36 projecting outwardly of the flange of a steel skeleton 35 is fixed to the internal surface of both sides of the upper flange of said steel skeleton by means of an adhesive agent 37, and molded plates 38, 39, 40 and 41 are also fixed between both flanges and along both lateral sides of the lower flange of steel skeleton by means of nails 42 respectively, for fixation thereto so that the under-floor beam $b'''$ can be constructed with the formation of a fire-proof covering layer of the required thickness composed of the molded plates 36, 38, 39, 40 and 41 combined in a body except for the upper surface of the steel skeleton 35. Then after the adhesive agent 37 has been applied to the upper exposed surface of steel skeleton 35, said beam $b'''$ is laid beneath the concrete floor $c$, a composite substance composed of asbestos and cement as a binding agent is filled between the steel skeleton 35 of said beam $b'''$, molded plate 36 and the concrete floor $c$ by blasting means to form an asbestos layer 43 for covering the steel skeleton 35.

By the way, no adhesive agent may be applied to the joint portions of the molded plate and steel skeleton for fixing purposes, depending on the kind of place for fixation of the molded plate, as the case may be. Moreover, after the steel skeleton has been covered by molded plates, a coating of synthetic resin may be employed to cover the entire surface of said fire-proof covering layer in some cases.

According to this construction, the steel skeleton is covered by the molded plates 36, 38, 39, 40 and 41 and the asbestos layer 43 satisfactorily, the adhesive agent 37 is applied to the joint portions of the steel skeleton 35 and molded plates 36, 38, 39, 40 and 41, nails 42 are struck onto the molded plates 39, 40 and 41 thus enclosing the lower flange of steel skeleton 35 for perfect fixation to the steel skeleton, thus obtaining the under-floor beam $b'''$ with the formation of a non-stripping-off, non-falling-off, durable and strong fire-proof covering layer.

FIGS. 11 and 12 show an embodiment of a pillar.

Namely an adhesive 45 is applied to the external surface of both front and back flanges of a steel H-beam section or skeleton 44, a molded plate 47 of the same width as that of the flange is placed along the external surface of each flange after which the adhesive agent 45 is also applied to both lateral surfaces of said front and back molded plates and the internal front and back end surfaces of molded plates 46 at both sides thereof so that the steel skeleton 44 can be covered by and fixed to the molded plates 46 and 47 by adhesion, a few nails 48 being inserted, from outside, for temporary support until the adhesive agent sets. The nails extending into the joint portions of the front and back molded plates 47 and other plates 46 at both sides, and simultaneously, clamps 49 being inserted into the outer surface of the molded plates 47 and the adjacent surfaces of the molded plates 46, and all this assembly combined in a body being fixed to the steel skeleton 44.

This operation is repeated in order along the steel skeleton 44 in the same direction and the adhesive agent 45 is also applied to the joint portions of adjacent molded plates 46 and 47, clamps 49 being inserted between them to assist in constructing the pillar $d$ with the formation of a fire-proof covering layer of the required thickness composed of said molded plates 46 and 47 combined in a body for arrangement outside the steel skeleton. According to this construction, the pillar of steel skeleton is covered by the molded plates 46 and 47, the adhesive agent 45 applied to the joint portion of the pillar 44 and molded plate 47 and also between the molded plates 46 and 47 themselves, the nails 48 and clamps 49 being inserted for fixing said molded plates together while the adhesive agents sets and with the pillar and molded plates in a body, thereby obtaining said pillar $d$ with the formation of a fire-proof non-stripping-off, non-falling-off, durable and strong covering layer.

As has been explained with reference to various embodiments illustrated hereinbefore, the present invention consists in preparing molded plates composed of such fire-proof material as asbestos fibers or the like and formed into the required shape and compressed to a volumetric specific gravity of 0.40 to 0.45, placing and jointing them suitably outside a steel skeleton and combining adjacent molded plates in a fixed body by means of a fire-proof adhesive agent to form a fire-proof covering layer for arrangement outside the steel skeleton. The adhesive agent being composed of sodium silicate 65% by weight, and of asbestos fibers, chamotte and fireproof cement 35% by weight. Therefore, by fixedly placing the molded plates outside the skeleton, it is possible to cover the exterior and every corner of the steel skeleton at a time and up to an exact size, thus simplifying the operating steps to be carried out in a quick and exact manner, saving manual labor considerably and enabling the allotment of manual labor to other operating steps to be made. Furthermore, as compared with the blasting method of prior art, the finished quality of such covering layer and bulk density throughout all flat parts and every corner of finished pillars and beams can be made uniform until such covering layers can be finished up to an exact size without requiring any special techniques for achievement of good results in the industry. Indeed, with the preparation of such molded plates in advance, it is possible to form a fire-proof covering structure by fixing them for arrangement outside a steel skeleton by means of an adhesive agent only, dispensing with the use of an air compressor, special equipment, water and electric power. Consequently a small floor spacing becomes sufficient for carrying out the method of this invention and all the materials for use are easy to handle, thus enabling working time to be reduced remarkably and improving the working efficiency considerably. In addition, the operator can work under good sanitary conditions, as there is no need to use any conventional apparatus such as compressor etc., thus getting least fatigued over the working operation and moreover, easily and safely even at any high place exposed to windy conditions in the open air. Moreover, the clamps and nails, employed for obtaining a temporary support until the adhesive agent is set, may be removed if it is necessary to do so. The removable clamps and nails refer to the nails and clamps which are accessible on the exterior of the fireproofed structural shape frame member. While in FIG. 1 the clamps 6 are shown covered by the individual plates 4, it can also be noted that the clamps 7 are located on the exterior of the plates 4. Furthermore, in FIGS. 3, 4, 6, 11 and 12, the clamps are shown on the exterior of the molded plates. When the adhesive material securing the molded plates together and to the structural shape frame member has set, it would be possible to remove the clamps or nails if such an operation is considered to be necessary. Any clamps or nails which are covered over by the molded plates of fireproof material could not be removed and their presence would not provide any problem since they are protected from any direct exposure to high temperature which might come in contact with the exterior surface of the fireproofed member. The mechanical attachment means located on the exterior of the fireproof material do not extend into contact with the surface of the structural shape frame member being fireproofed. Therefore, the clamps or nails are arranged so that they do not afford a thermal bridge through the fire-proof layer from its exterior surface to the structural shape enclosed. Further, it can be appreciated that mechanical means other than those specifically described herein can be used to support the molded plates temporarily about the structural shapes while the adhesive agent is achieving its set.

What is claimed is:

1. A method of fireproofing a structural frame member of the type having a web section and at least one flange section extending angularly from the web section, comprising the steps of forming plates of a compressed molded fireproof material to sizes to fit closely over the exposed surfaces of the structural frame member, placing the molded fireproof material plates over the exposed surfaces of the frame member and in contacting relationship with adjacent ones of the molded plates for completely enclosing the frame member, adhering the molded plates to the frame member by means of a fireproof adhesive agent so that the plates are fixed directly to the exposed surfaces of the structural frame member, adhering the contacting molded plates together by means of the adhesive agent for completely enclosing the structural frame member by means of the molded plates and the adhesive agent, and inserting mechanical attaching means into the molded plates when they are applied to the structural frame member for holding the molded plates together and in position on the structural frame member while the adhesive agent is setting for securing the molded plates to the structural frame member and to one another and placing the clamping means so that no temperature bridging occurs through the clamping means between the exterior of the fireproofing provided by the molded plates and the structural frame member.

2. A method of covering a structural shape frame member for fireproofing purposes with a plurality of molded plates made of a fireproof material, comprising the steps of shaping individual ones of the molded plates to cover the exposed surfaces of the structural frame member, applying a highly fireproof adhesive agent to the surfaces of the molded plates and to the structural frame member which are to be placed in contact with one another, using mechanical attachment means for securing the molded plates to the structural shape frame member and to the other molded plates for holding the molded plates on the structural frame member until the adhesive agent hardens for holding the molded plates in place, and locating the mechanical attachment means so that no direct temperature bridging occurs between the exterior surface of the molded plates and the surface of the structural shape frame member when the mechanical means are retained in place.

3. A method of covering a structural shape frame member for fireproofing purposes, as set forth in claim 2, wherein the molded plates are made of fiber-open asbestos and cement as a binding agent and are hardened by compression until they attain the required size, shape and volumetric specific gravity.

4. A method of covering a structural shape frame member for fireproofing purposes, as set forth in claim 2, wherein the adhesive agent is composed of 65% by weight of sodium silicate and 35% by weight of asbestos fibers, chamotte and fireproof cement.

5. A method of covering a structural shape frame member for fireproofing purposes, as set forth in claim 2, wherein the molded plates are made of a fireproof material selected from the group consisting of asbestos fibers, vermiculite, perlite, gypsum and rock wool and a suitable amount of an adhesive agent and are hardened by compression until they attain the required size, shape and specific gravity of 0.40 to 0.45.

References Cited

UNITED STATES PATENTS

| | | | |
|---|---|---|---|
| 1,779,721 | 10/1930 | Yeager | 52—423 |
| 1,984,132 | 12/1934 | Hanna | 52—746X |
| 2,074,463 | 3/1937 | Davis | 52—725X |
| 2,142,165 | 1/1939 | Young et al | 52—725X |
| 2,267,929 | 12/1941 | Lefebure et al. | 52—725 |
| 3,217,456 | 11/1965 | Quigg et al. | 52—423 |
| 3,336,710 | 8/1967 | Raynes | 52—417X |

PRICE C. FAW, Jr., Primary Examiner

U.S. Cl. X.R.

52—423, 727; 161—403